United States Patent [19]

O'Neill et al.

[11] Patent Number: 5,660,403

[45] Date of Patent: Aug. 26, 1997

[54] MULTIPURPOSE BEACH CART

[76] Inventors: J. Douglas O'Neill, 31 Morgans Cove Dr.; Robert W. Hooper, Jr., 3805 Hartnett Blvd., both of Isle of Palms, S.C. 29451; John J. Weber, 8309 Raintree La., Charlotte, N.C. 28277

[21] Appl. No.: 575,901

[22] Filed: Dec. 20, 1995

[51] Int. Cl.⁶ .......................................................... B62B 1/00
[52] U.S. Cl. ................. 280/47.19; 280/47.3; 280/47.28
[58] Field of Search ........................... 280/47.131, 47.17, 280/47.19, 47.2, 47.24, 47.26, 47.27, 47.3, 47.31, 47.32, 47.33, DIG. 4, 47.28

[56] References Cited

U.S. PATENT DOCUMENTS

| | | | |
|---|---|---|---|
| D. 154,640 | 7/1949 | Sasser | 280/47.19 |
| 2,835,503 | 5/1958 | Humphries et al. | 280/47.19 |
| 3,052,484 | 9/1962 | Huffman et al. | 280/47.19 |
| 3,054,622 | 9/1962 | Davis et al. | 280/47.3 |
| 3,560,015 | 2/1971 | Tracy | 280/47.3 |
| 3,677,571 | 7/1972 | Maturo, Jr. et al. | 280/47.3 |
| 4,355,818 | 10/1982 | Watts | 280/47.26 |
| 4,521,030 | 6/1985 | Vance | 280/47.26 |
| 4,585,130 | 4/1986 | Brennan | 280/47.28 |
| 4,887,837 | 12/1989 | Bonewicz, Jr. et al. | 280/47.26 |

*Primary Examiner*—Brian L. Johnson
*Assistant Examiner*—Min Yu
*Attorney, Agent, or Firm*—Dallis Law Firm, P.A.

[57] ABSTRACT

A multipurpose beach cart for transporting materials to and from a beach or picnic destination. A cage frame with a wide roller is hand-pulled over sandy or beach terrain. The cage frame holds loose, bulky items such as towels and blankets. A basket is attached to the upper portion of the cage frame for holding smaller personal items such as sunbathing paraphernalia. A table attachment allows for the transportation of larger items and can double as a table after arriving at the desired location.

14 Claims, 3 Drawing Sheets

MULTIPURPOSE BEACH CART

BACKGROUND OF THE INVENTION

1. Field of the Invention

The present invention relates to a hand pulled cart design and, more particularly, to a lightweight, multipurpose beach cart used to carry materials to and from a sun bathing or picnic area.

2. Description of the Related Art

As beach and sun bathing areas continue to be popular destination site for relaxation, the existence of a convenient and efficient means to transport beach paraphernalia and associated items remains problematic. Visiting the beach may be a full day affair involving the use of food, cold beverages, games, sun block and protective clothing, not to mention the standard towels and blankets. The transportation of these items through hot, loose sand can be very difficult and frustrating. The existing art includes various carts or caddies typically constructed of metal or wood components. Although these devices can facilitate in the transportation of materials to and from a sun bathing area, their heavy and sometimes bulky construction may be cumbersome.

The prior art in this field includes U.S. Pat. No. 4,703,944 to Michael E. Higson which relates to a beach caddie designed as a carrying cart for the transportation of chairs, coolers, beach umbrellas and other items. After arriving at the beach, the caddie can be converted into a table that includes holders for beverage cans, fishing poles and an umbrella. Although the Higson patent provides for the carrying of numerous items and doubles as a table once at a desired location, its many components and hinges make it a complicated and expensive design. The wide wheels located on the sides of the caddie do not facilitate transportation over sandy terrain that may hinder the bottom center portion of the caddie.

U.S. Pat. No. 4,316,615 to Norval K. Willette relates to a picnic beach cart designed to carry supplies to a beach or picnic area. After being used as a transportation device, the picnic beach cart can be used as a table. The Willette cart is primarily designed for carrying large items such as coolers and not aptly equipped to carry loose, personal sun bathing items.

U.S. Pat. No. 2,840,142 to Donald J. Sands relates to a folding beach cart designed to carry supplies to the beach when assembled into its cart configuration. The cart can then be unfolded into a reclining chair or pallet. The Sands invention is limited in the quantity and type of beach supplies that may be carried in its cart form.

U.S. Pat. No. 3,758,128 to Lauri Stenwall relates to a combined beach chair and shopping cart designed to transport items to the beach or act as a shopping and laundry cart. The Stenwall invention can then be converted into a chair but only after removing the wheels. Similar to the Sands invention, the Stenwall invention is limited in the types and quantities of supplies it can carry.

In each of the prior art references provided, and those reviewed, none of the multipurpose carrying carts emphasize lightweight, simple construction and at the same time maximize their multipurpose attributes in the same fashion as does the present invention. The multipurpose beach cart has few moving parts and is designed to be easy to use and construct. It incorporates all the utilitarian elements of the most comprehensive existing carts combined with a lightweight, easy-to-use design.

SUMMARY OF THE INVENTION

It is therefore an objective of this invention to provide a durable and reliable multipurpose beach cart for transporting various and sundry items to and from a sunbathing or picnic location.

It is further an objective of this invention to provide a lightweight and effective means of transporting items over loose sand and similar beach terrain.

It is still further an objective of this invention to be used as a table suitable for supporting food and beverages after the user of the inventions arrives at his/her desired destination.

These as well as other objectives are accomplished with a multipurpose beach cart supported by a wide roller designed to travel over a variety of surfaces including loose sand often found on beaches. The cart is hand-pulled by means of a handle attached to the top portion of the cage frame. The cage frame is designed to hold bulky items such as blankets, towels and other similar materials. In addition to the cage frame, the cart incorporates the use of a detachable basket and table. The basket is secured near the top of the cart opposite the cage frame. The basket is designed with a tight mesh netting suitable for containing small, loose items such as suntan lotion, sunglasses, beach games and other similar objects.

BRIEF DESCRIPTION OF THE DRAWINGS

A preferred embodiment of the present invention is described herein with reference to the drawings wherein.

DETAILED DESCRIPTION OF THE PREFERRED EMBODIMENT

Figure 1:
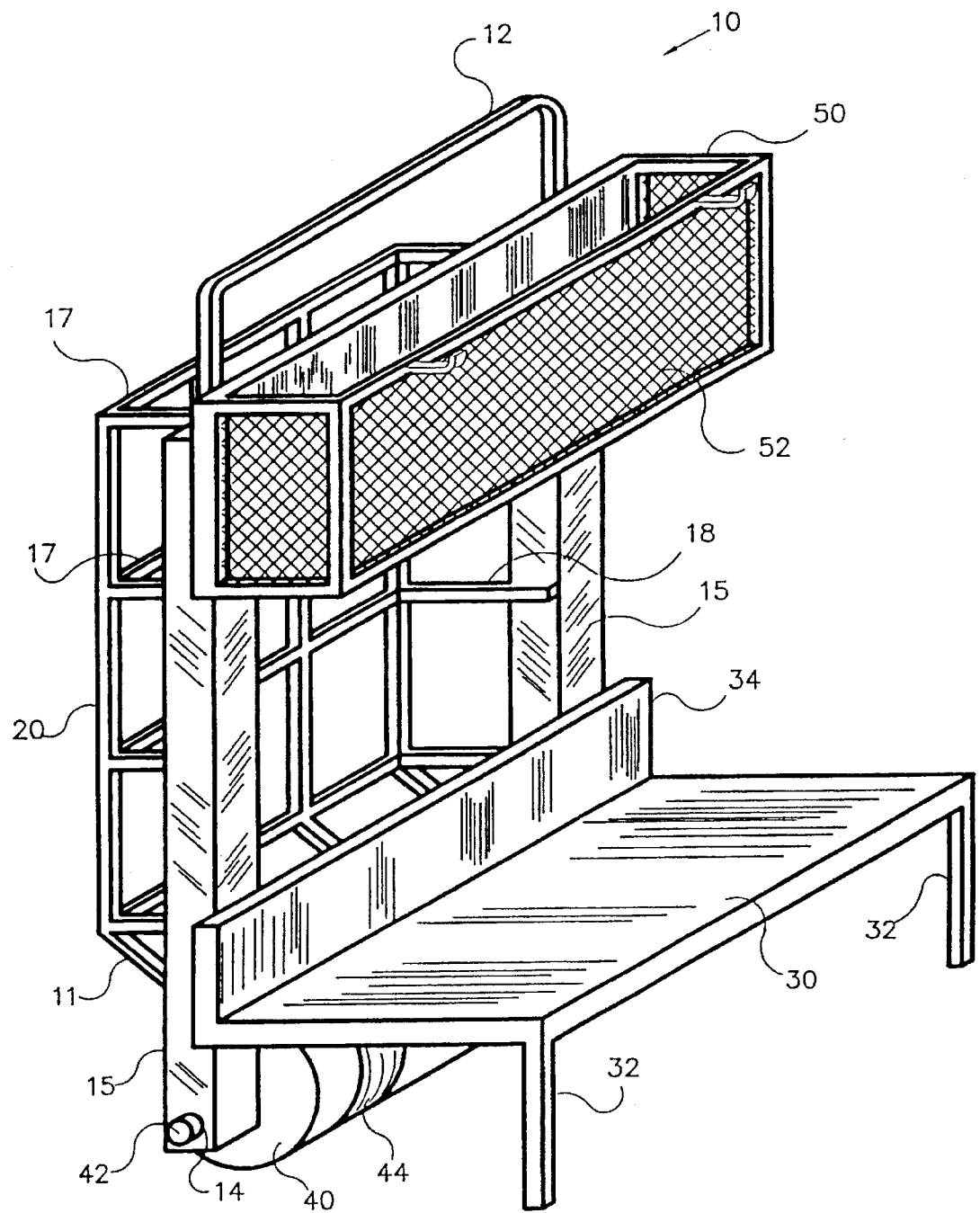
FIG. 1 of the drawings shows a perspective view of the multipurpose beach cart revealing the basket and table side of the cart.
Figure 2:
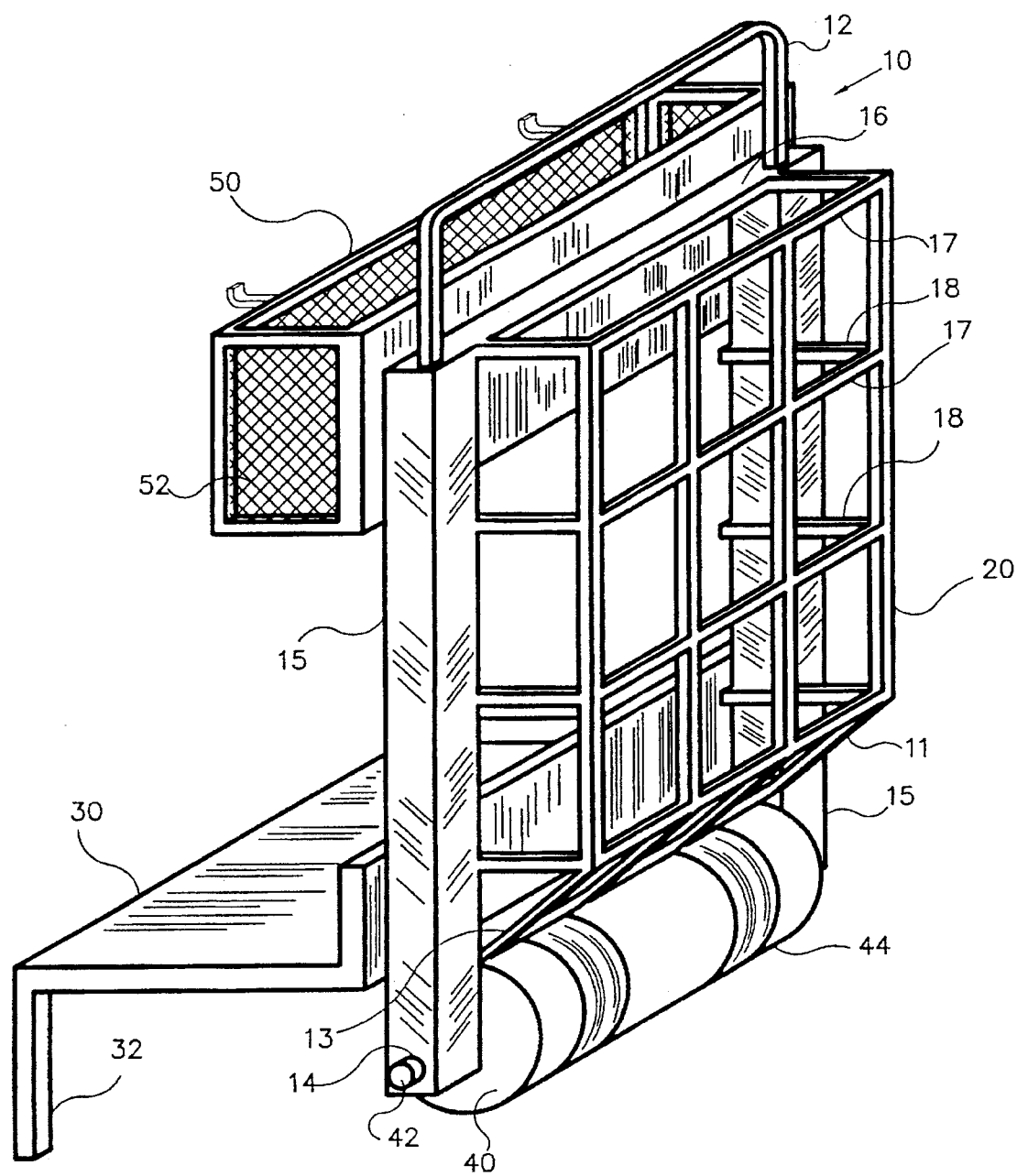
FIG. 2 of the drawings shows a perspective view of the multipurpose beach cart revealing the cage frame side of the cart.

Referring to the drawings by numerals of reference, there is shown in FIG. 1 and FIG. 2 the Multipurpose Beach Cart (10). This cart (10) comprises a cage frame (20), a detachable basket (50) and detachable table (30). The entire cart (10) is designed to travel over beach terrain by means of a wide roller (40).

Referring to FIGS. 1 and 2, the cage frame (20) is supported by a first and second side brace (15), a top bar (16) and a bottom bar (13). The actual cage portion of the frame (20) is attached to the first and second side braces (15) by side brace slats (18). Additional support is provided to the cage frame (20) by horizontal members (17). Folded towels and blankets rest inside the cage frame (20), and are kept from falling out by means of angled members (11) that attach to the bottom bar (13). The cart (10) is hand-pulled by means of a handle (12) attached to the top bar (16).

Still referring to FIGS. 1 and 2, a basket (50) and table (30) are secured to the cage frame (20) by a tongue and grove attachment means. The table (30) sits horizontal to the ground surface when the cart (10) is in an upright resting position as shown in both FIGS. 1 and 2. The table (30) is of sufficient width and length to support a large cooler used to hold beverages and food. The table (30) comprises a first and second leg (32) designed to hold the cart (10) in an upright position when needed. The basket (50) attaches to the cage frame (20) and is designed to carry loose materials. A webbed netting (52) holds these loose materials in the basket (50) during transport.

FIGS. 1 and 2 also illustrate the attachment means of the wide roller (40) to the cage frame (20). The roller axil (42) secures the wide roller to the cage frame (20) through a first and second axle sleeve (14) located at the lower end of the first and second side braces (15) of the cage frame (20). Traction strips (44) are secured to the wide roller (40) to enhance traction and griping over smooth surfaces.

Figure 3:
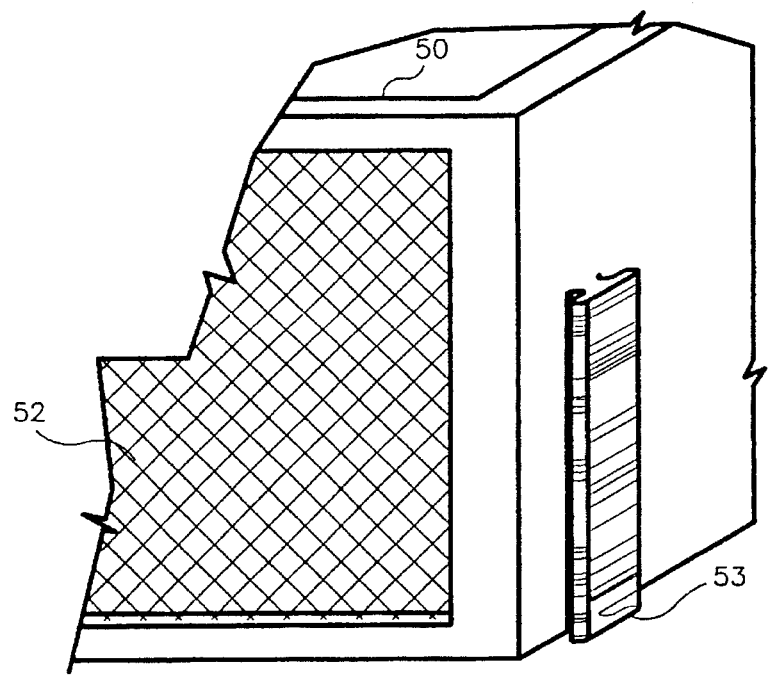
FIG. 3 of the drawings shows a blow up, perspective view of the basket detailing the tongue fitting.
Figure 3A:
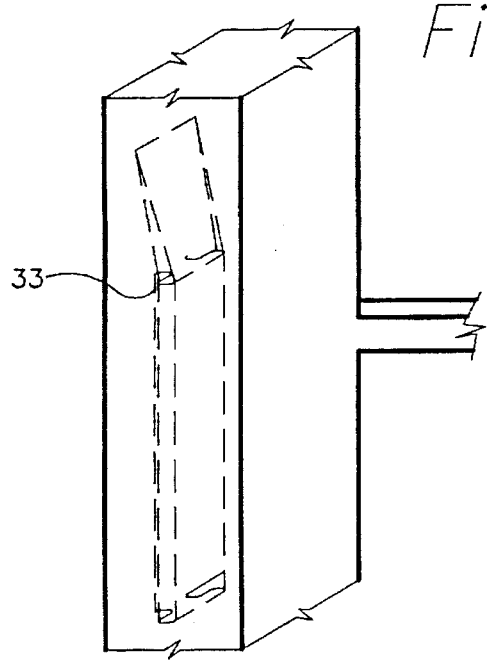
FIG. 3a of the drawings shows a perspective view of the side brace detailing the lower groove wall fitting.
Figure 3B:
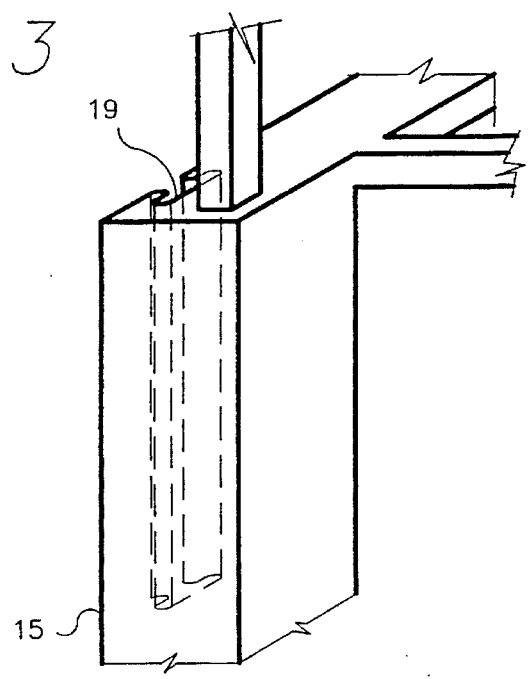
FIG. 3b of the drawings shows a perspective view of the side brace detailing the upper groove wall fitting.

FIGS. 3, 3a, and 3b illustrate the tongue and groove attachment means for securing the basket (50) and table (30) to the side braces (15) of the cart (10). The basket (50) is proximately located near the handle (12). The basket (50) is attached to the side braces (15) by means of the basket tongue (53) that slides into the upper groove walls (19) of the side braces (15). The table (30) is similarly attached to the wide roller (40) end of the side braces (15) by means of the vertical table end (34) of the table (30) which slides into the lower groove walls (33) of the side braces (15). The location of the table (30) is such that the first and second legs (32) will support the cart (10) in an upright position without other support.

A preferred embodiment of the present invention is described herein. It is to be understood, of course, that changes and modifications may be made in the embodiment without departing from the true scope and spirit of the present invention as defined by the appending claims.

That which is claimed is:

1. A multipurpose beach cart comprising, in combination:
   a. a cage frame having a roller end and a handle end comprising:
      i. a first and second vertical side brace each having a top end and a bottom end;
      ii. a top bar connected perpendicularly to said top ends of said first and second vertical side braces;
      iii. a bottom bar connected perpendicularly to said bottom ends of said first and second vertical side braces opposite said top bar wherein said vertical side braces, said top bar and said bottom bar form a rectangle;
      iv. an open cage comprising:
         a plurality of side extension members extending perpendicularly from said first and second vertical side braces, each said side extension member having a brace end and a connecting end wherein said brace end is connected to said vertical side braces;
         a plurality of horizontal members each having a first and second end, said first end of each said horizontal member being connected perpendicularly to one said connecting end of one said side extension member of said first vertical side brace, said second end of each said horizontal member being connected perpendicularly to one said connecting end of one said side extension member of said second vertical side brace wherein said horizontal members are parallel to said top bar and said bottom bar of said cage frame;
         a top and bottom horizontal member wherein said top horizontal member consists of one said horizontal member proximately located nearest said top bar, and said bottom horizontal member consists of one said horizontal member proximately located nearest said bottom bar;
         a plurality of vertical members each having a top end, bottom end and a middle portion, said top end of each said vertical member being connected perpendicularly to said top horizontal member of said open cage, said bottom end of each said vertical member being connected perpendicularly to said bottom horizontal member of said open cage, said middle portion of said vertical members being connected perpendicularly to said horizontal members wherein said vertical members are parallel to said vertical side braces;
         a plurality of angled members each having a top member end and a bottom member end wherein said bottom member end is connected to said bottom bar and said top member end is connected to said bottom horizontal member;
   b. a wide roller roughly cylindrical in shape rotatably mounted to said bottom ends of said vertical side braces of said roller end of said cage frame;
   c. a basket proximately located at said handle end of said first and second vertical side brace attached opposite said open cage;
   d. a table proximately located at said roller end of said first and second vertical side brace attached opposite said open cage.

2. A multipurpose beach cart as claimed in claim 1 wherein said wide roller is rotatably mounted to said bottom ends by means of an axle system comprising:
   a. a first and second vertical side brace bore located at said first and second bottom ends of said first and second vertical side braces;
   b. a centered wide roller axle bore extending lengthwise through said wide roller;
   c. an axle with a first and second axle end and a middle axle portion, wherein said first axle end inserts into said first vertical side brace bore and said second axle end inserts into said second vertical side brace bore and said middle axle portion inserts through said centered wide roller axle bore wherein said wide roller rotates concentrically around said axle.

3. A multipurpose beach cart as claimed in claim 1 wherein a handle is secured to said top bar of said cage frame for manual pulling or pushing of said multipurpose beach cart.

4. A multipurpose beach cart as claimed in claim 3 wherein said handle is U-shaped having a first and second handle end and a griping portion, said first handle end attached to said top end of said first vertical side brace, said second handle end attached to said top end of said top end of said second vertical side brace wherein said griping portion of said handle runs roughly parallel to said top bar of said cage frame.

5. A multipurpose beach cart as claimed in claim 1 wherein said basket comprises:
   a. a solid front wall attached to said handle end of said first and second vertical side braces;
   b. a netted back wall being equal in dimensions to said solid front wall and directly opposite and parallel to said solid front wall;
   c. a first and second netted side wall being equal in dimensions to each other and directly opposite and parallel to each other each having a first and second front and back edge wherein said first and second front edges are perpendicularly connected to said solid front wall and said first and second back edges are perpendicularly connected to said netted back wall;

d. a bottom netted wall perpendicularly connected to said solid front wall, said netted back wall and said first and second netted side walls.

6. A multipurpose beach cart as claimed in claim 5 wherein said back netted wall comprises a top edge and a bottom edge, said bottom edge connected to said bottom netted wall.

7. A multipurpose beach cart as claimed in claim 6 wherein said top edge of said back netted wall contains a number of basket hooks.

8. A multipurpose beach cart as claimed in claim 1 wherein said table comprises:

a. a flat table member extending perpendicularly from said first and second vertical side braces wherein said flat table member is rectangular in shape with a width dimension running adjacent said cage frame approximately equal in dimension to a distance as measured from a first outside edge of said first side brace to a second outside edge of said second side brace;

b. a vertical table end extending perpendicularly to said flat table member having an inner face and an outer face wherein said inner face abuts and is secured to said vertical first and second side brace;

c. a first and second leg extending perpendicularly to said flat table in a downward direction toward a ground surface wherein said first and second legs of such length and size as to support said multipurpose beach cart in an upright position when placed in a resting, unassisted vertical position.

9. A multipurpose beach cart as claimed in claim 1 wherein said basket is detachably removable from said first and second vertical side braces by means of a tongue and groove attachment.

10. A multipurpose beach cart as claimed in claim 9 wherein said tongue and groove attachment comprises:

a. a first and second tongue running vertically along a back face of said solid front wall of said basket wherein said back face abuts said first and second vertical side brace, said first and second tongue comprising:

i. a first and second neck portion extending outward from said back face of said solid front wall of said basket;

ii. a first and second head portion emerging from said first and second neck portion and being wider in cross section than said first and second neck portion;

b. a first and second groove wall running lengthwise from said top end of said first and second vertical side brace opposite said open cage for a distance approximately equal in length to a distance between said top edge and said bottom edge of said bottom netted wall of said basket wherein said first and second groove wall comprises:

i. a first and second entrance narrower than the width of said first and second head portion of said first and second tongue;

ii. a first and second slit running the length of said first and second groove wall wherein said first and second slit receives said first and second head portion of said first and second tongue when said first and second head slides down said first and second slit.

11. A multipurpose beach cart as claimed in claim 1 wherein said table is detachably removable from said first and second vertical side braces by means of a tongue and groove attachment.

12. A multipurpose beach cart as claimed in claim 11 wherein said tongue and groove attachment comprises:

a. a first and second tongue running vertically along said inner face of said vertical table end of said table wherein said inner face abuts said first and second vertical side brace, said tongue comprising:

i. a first and second neck portion extending outward from said inner face of said vertical table end of said table;

ii. a first and second head portion emerging from said first and second neck portion and being wider in cross section than said first and second neck portion;

b. a first and second groove wall running lengthwise from said bottom end of said first and second vertical side brace opposite said open cage wherein said first and second groove wall comprises:

i. a first and second entrance narrower than the width of said first and second head portion of said first and second tongue;

ii. a first and second slit running the length of said first and second groove wall wherein said first and second slit receives said first and second head portion of said first and second tongue when said first and second head slides down said first and second slit.

13. A multipurpose beach cart as claimed in claim 1 wherein said cage frame, wide roller, basket and table are made of hard plastic.

14. A multipurpose beach cart comprising, in combination:

a. a cage frame having a roller end and a handle end comprising:

i. a first and second vertical side brace each having a top end and a bottom end;

ii. a top bar connected perpendicularly to said top ends of said first and second vertical side braces;

iii. a bottom bar connected perpendicularly to said bottom ends of said first and second vertical side braces opposite said top bar wherein said vertical side braces, said top bar and said bottom bar form a rectangle;

iv. an open cage comprising:

a plurality of side extension members extending perpendicularly from said first and second vertical side braces, each said side extension member having a brace end and a connecting end wherein said brace end is connected to said vertical side braces;

a plurality of horizontal members each having a first and second end, said first end of each said horizontal member being connected perpendicularly to one said connecting end of one said side extension member of said first vertical side brace, said second end of each said horizontal member being connected perpendicularly to one said connecting end of one said side extension member of said second vertical side brace wherein said horizontal members are parallel to said top bar and said bottom bar of said cage frame;

a top and bottom horizontal member wherein said top horizontal member consists of one said horizontal member proximately located nearest said top bar, and said bottom horizontal member consists of one said horizontal member proximately located nearest said bottom bar;

a plurality of vertical members each having a top end, bottom end and a middle portion, said top end of each said vertical member being connected perpendicularly to said top horizontal member of said open cage, said bottom end of each said vertical member being connected perpendicularly to said bottom horizontal member of said open cage, said middle portion of said vertical members being connected perpendicularly to said horizontal members wherein said vertical members are parallel to said vertical side braces;

a plurality of angled members each having a top member end and a bottom member end wherein said bottom member end is connected to said bottom bar and said top member end is connected to said bottom horizontal member;

b. a wide roller roughly cylindrical in shape rotatably mounted to said bottom ends of said vertical side braces of said roller end of said cage frame;

c. a basket proximately located at said handle end of said first and second vertical side brace attached opposite said open cage;

d. a table proximately located at said roller end of said first and second vertical side brace attached opposite said open cage;

e. an axle system comprising:
 i. a first and second vertical side brace bore located at said first and second bottom ends of said first and second vertical side braces;
 ii. a centered wide roller axle bore extending lengthwise through said wide roller;
 iii. an axle with a first and second axle end and a middle axle portion, wherein said first axle end inserts into said first vertical side brace bore and said second axle end inserts into said second vertical side brace bore and said middle axle portion inserts through said centered wide roller axle bore wherein said wide roller rotates concentrically around said axle;

f. a handle secured to said top bar of said cage frame for manual pulling or pushing of said multipurpose beach cart wherein said handle is U-shaped having a first and second handle end and a griping portion, said first handle end attached to said top end of said first vertical side brace, said second handle end attached to said top end of said top end of said second vertical side brace wherein said griping portion of said handle runs roughly parallel to said top bar of said cage frame;

g. said basket comprising:
 i. a solid front wall attached to said handle end of said first and second vertical side braces;
 ii. a netted back wall being equal in dimensions to said solid front wall and directly opposite and parallel to said solid front wall;
 iii. a first and second netted side wall being equal in dimensions to each other and directly opposite and parallel to each other each having a first and second front and back edge wherein said first and second front edges are perpendicularly connected to said solid front wall and said first and second back edges are perpendicularly connected to said netted back wall;
 iv. a bottom netted wall perpendicularly connected to said solid front wall, said netted back wall and said first and second netted side walls;

h. said back netted wall comprising a top edge and a bottom edge, said bottom edge connected to said bottom netted wall;

i. said top edge of said back netted wall containing a number of basket hooks;

j. said table comprising:
 i. a flat table member extending perpendicularly from said first and second vertical side braces wherein said flat table member is rectangular in shape with a width dimension running adjacent said cage frame approximately equal in dimension to a distance as measured from a first outside edge of said first side brace to a second outside edge of said second side brace;
 ii. a vertical table end extending perpendicularly to said flat table member having an inner face and an outer face wherein said inner face abuts and is secured to said vertical first and second side brace;
 iii. a first and second leg extending perpendicularly to said flat table in a downward direction toward a ground surface wherein said first and second legs of such length and size as to support said multipurpose beach cart in an upright position when placed in a resting, unassisted vertical position;

k. said basket being detachably removable from said first and second vertical side braces by means of a tongue and groove attachment wherein said tongue and groove attachment comprises:
 i. a first and second tongue running vertically along a back face of said solid front wall of said basket wherein said back face abuts said first and second vertical side brace, said first and second tongue comprising:
  (1) a first and second neck portion extending outward from said back face of said solid front wall of said basket;
  (2) a first and second head portion emerging from said first and second neck portion and being wider in cross section than said first and second neck portion;
 ii. a first and second groove wall running lengthwise from said top end of said first and second vertical side brace opposite said open cage for a distance approximately equal in length to a distance between said top edge and said bottom edge of said bottom netted wall of said basket wherein said first and second groove wall comprises:
  a first and second entrance narrower than the width of said first and second head portion of said first and second tongue;
  a first and second slit running the length of said first and second groove wall wherein said first and second slit receives said first and second head portion of said first and second tongue when said first and second head slides down said first and second slit;

l. said table being detachably removable from said first and second vertical side braces by means of a tongue and groove attachment wherein said tongue and groove attachment comprises:
 i. a first and second tongue running vertically along said inner face of said vertical table end of said table wherein said inner face abuts said first and second vertical side brace, said tongue comprising:
  a first and second neck portion extending outward from said inner face of said vertical table end of said table;
  a first and second head portion emerging from said first and second neck portion and being wider in cross section than said first and second neck portion;
 ii. a first and second groove wall running lengthwise from said bottom end of said first and second vertical side brace opposite said open cage wherein said first and second groove wall comprises:
a first and second entrance narrower than the width of said first and second head portion of said first and second tongue;
a first and second slit running the length of said first and second groove wall wherein said first and second slit receives said first and second head portion of said first and second tongue when said first and second head slides down said first and second slit;

m. said cage frame, wide roller, basket and table are made of hard plastic.

* * * * *